United States Patent [19]

Shinmoto

[11] Patent Number: 4,478,564
[45] Date of Patent: Oct. 23, 1984

[54] AIR RING FOR INFLATION FILM MOLDING

[75] Inventor: Jitsumi Shinmoto, Tokyo, Japan

[73] Assignee: Tomi Machinery Manufacturing Co., Ltd., Tokyo, Japan

[21] Appl. No.: 527,941

[22] Filed: Aug. 30, 1983

[51] Int. Cl.$^3$ .......................... B29C 1/00; B29F 3/08
[52] U.S. Cl. .............................. 425/72 R; 425/378 R
[58] Field of Search ............ 425/72 R, 376 R, 378 R; 264/565

[56] References Cited

U.S. PATENT DOCUMENTS

| | | | |
|---|---|---|---|
| 3,176,347 | 4/1965 | Shaul | 425/72 R |
| 3,529,047 | 9/1970 | Yoshida et al. | 264/569 |
| 3,819,790 | 6/1974 | North et al. | 425/72 R |
| 4,236,884 | 12/1980 | Schott | 425/72 R |
| 4,259,047 | 3/1981 | Cole | 425/72 R |
| 4,265,853 | 5/1981 | Havens | 425/72 R |
| 4,272,231 | 6/1981 | Schott | 425/72 R |
| 4,330,501 | 5/1982 | Jones et al. | 425/72 R |
| 4,373,273 | 2/1983 | Church | 425/72 R |

FOREIGN PATENT DOCUMENTS 197808 8/1978 Fed. Rep. of Germany .... 425/72 R

*Primary Examiner*—Willard E. Hoag
*Attorney, Agent, or Firm*—Poms, Smith, Lande & Rose

[57] ABSTRACT

To the end of producing high quality film from thermoplastic resin through inflation molding, there is provided an air ring which has a plurality of slits for guiding cooling air therethrough onto the film. These slits are defined by a plurality of frusto-conical channel defining bodies which are arranged like a set of nested boxes and are provided with different exit angles at their outlets. Through appropriate distribution of the air outlets for cooling the film, a uniform inflation molding becomes possible, allowing a greater molding speed at the same time. The broader ends of the channel defining bodies are mutually threaded in such a manner that they may be independently adjusted along an axial direction. With additional provision of a retractable annular plate at the outlet of a main cooling air channel and proper adjustment of the channel defining bodies, the air ring may be adapted to molding dies of different diameters.

10 Claims, 9 Drawing Figures

FIG. 7
FIG. 8
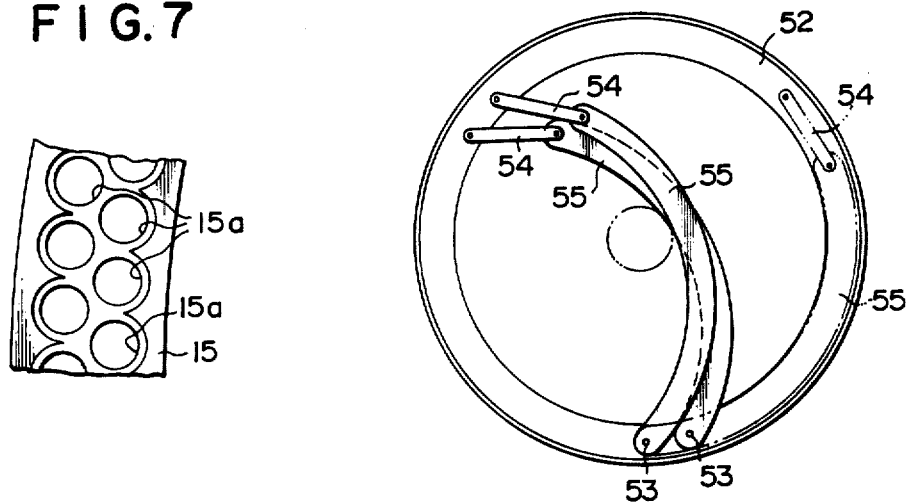
FIG. 9
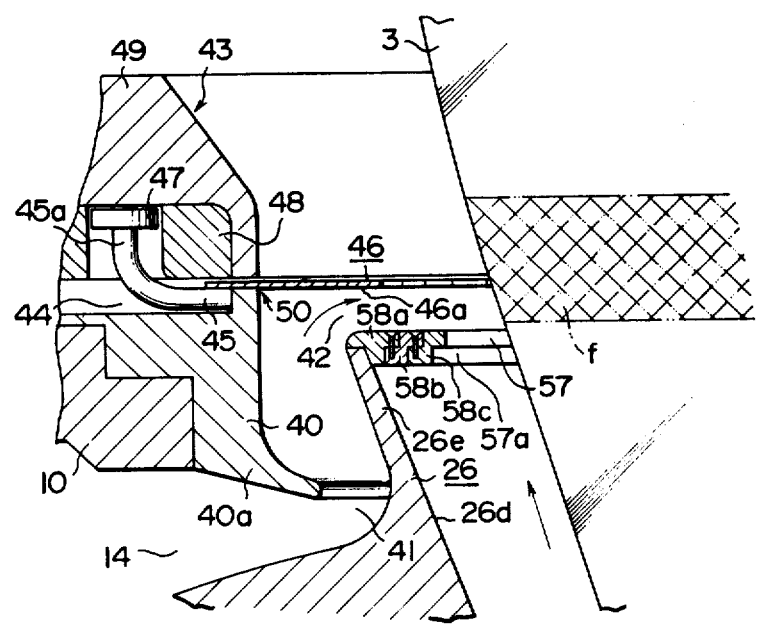

AIR RING FOR INFLATION FILM MOLDING

This invention relates to an air ring for inflation film molding and in particular to such an air ring which is provided with a plurality of branched-out slits for blowing air onto an extrusion molded film from more than one direction for better molding results.

The inflation molding process is a widely known technique for molding thin film from thermo-plastic synthetic resins and has been in wide use for the manufacture of food wraps and plastic bags. In carrying out this process, it has been known that there are several problems which have to be eliminated somehow. These problems become significant particularly when the molding speed is increased. Some of the problems encountered in conducting the inflation molding include blocking which due to inadequate cooling of the molded film some part of the film becomes attached to another part of the film causing considerable inconvenience in the following processes, uneven wall thickness of the film, lack of transparency which considerably impairs the commercial value of the final product, and so on.

In view of such shortcomings and inconveniences of the prior art, a primary object of this-invention is to provide an air ring which is free from the above-mentioned shortcomings by having a greater cooling effect than conventional ones in inflation molding thermoplastic resins such as polyethylene, polyester, polypropylene, polyamid and so on, and in particular an air ring which can produce highly transparent tubular film by inflation molding low-density polyethylene (L-LDPE) or the like.

According to this invention, such an object is accomplished by providing an air ring for inflation film molding in which cooling action is obtained by blowing cooling air out from a horizontal annular slit after the film is extrusion molded by a die, comprising an air ring main body consisting of a hollow annular body and communicating with an air supply tube, a slit defining annular body which is disposed substantially coaxially with and within the air ring main body for defining a primary air outlet having the horizontal annular slit for cooling the molded film by blowing the cooling air thereonto, and a channel communicating the air ring main body with the primary air outlet and with another air slit defining annular body, the channel being branched out in the latter slit defining annular body into a plurality of slits for blowing the cooling air onto the extrusion molded film from more than one direction.

Now other objects and advantages of this invention will become apparent from the following description taken in conjunction with the accompanying drawings, in which:

FIG. 7 is a plan view of a part of the annular air flow straightening vanes unit;

FIG. 8 is a different embodiment of the slit defining body; and

FIG. 9 is a sectional view similar to FIG. 3 showing a means for adapting the air ring to a smaller molding die.

Figure 1:
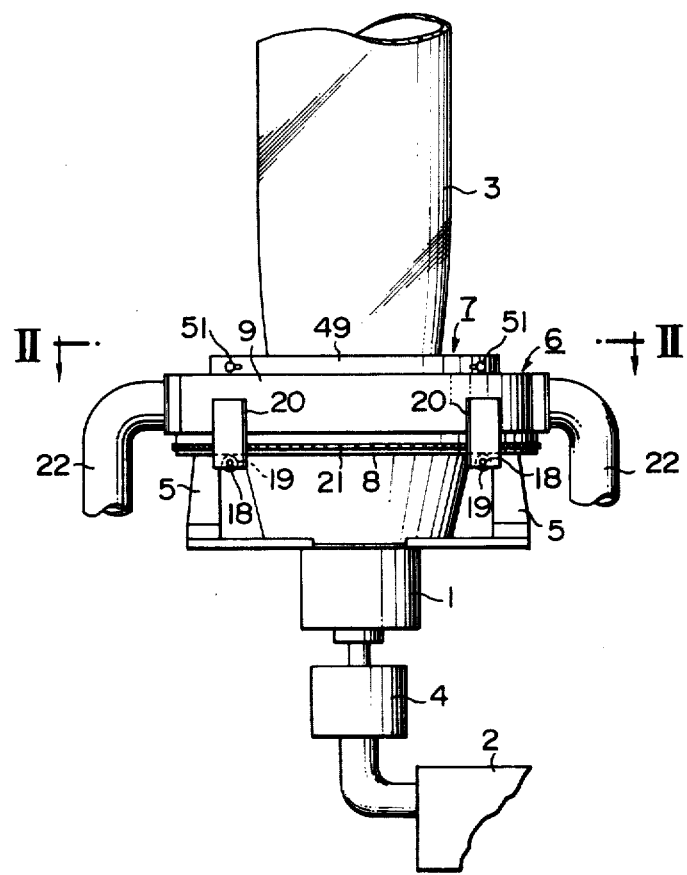
FIG. 1 is a front view of an embodiment of the air ring according to this invention which is applied to an inflation molding process.

Numeral 1 denotes a die which is designed to extrusion mold molten thermo-plastic resin supplied from an extruder 2 connected to the lower portion of the die 1 above an annular lip 1a provided on the upper surface of the die 1 so as to mold a bubble 3 consisting of tubular thin film.

And the die 1 is supported on the extruder 2 by way of a rotor 4 connected to the lower end thereof so as to be rotatable about a vertical axial line, and in turn supports an annular air ring 6 by way of L-shaped support arms 5 projecting from the periphery of the upper surface of the die 1.

Figure 3:
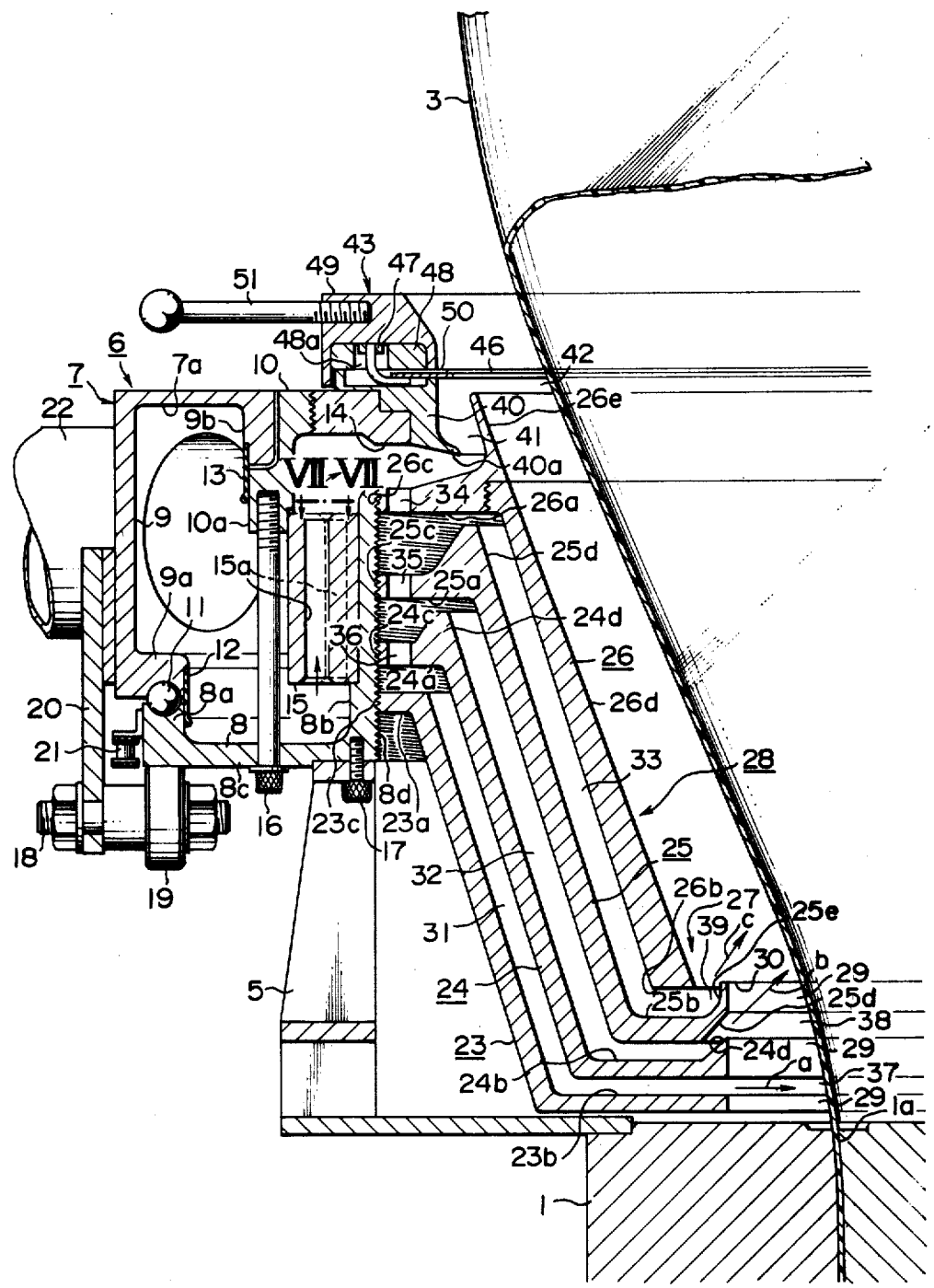
FIG. 3 is a vertical sectional view taken along line III—III of FIG. 2 in a magnified scale.

As shown in FIG. 3, an air ring main body 7 defining a hollow annular passage 7a is comprised of three casings; i.e., a moveable casing or a lower casing 8 having an upwardly opening, a fixed casing or a side casing 9 which is likewise annular and has an opening at lower inwardly portion thereof, and an upper casing 10 covering the inwardly upper side of the air ring main body 7.

A ball bearing 11 is interposed between the upper end surface of an annular outer wall 8a of the lower casing 8 and a bottom wall 9a of the side casing 9, and the gap therebetween is sealed air tight by a seal ring 12.

An annular wall 10a is provided around the outer periphery of the upper casing 10 and this annular wall 10a is slidably engaged with a similar annular wall 9a of the side casing 9 with the gap therebetween sealed air tight by a seal ring 13.

Between the lower surface of the upper casing 10 and the upper end of the annular inner wall 8b is disposed an annular opening 14 facing the inwardly direction. An annular air flow straightening vanes unit 15 (See FIG. 7) having a multiplicity of vertically extending holes 15a along the circumferential direction is inserted between the annular wall 10a and the annular inner wall 8b.

The upper casing 10 and the lower casing 8 are connected into an intergral body by bolts 16.

The lower surface of the bottom plate 8c of the upper casing is, at its internal portions, secured to the support arms 5 with bolts 17.

A plurality of support brackets 20 are fixed to the external portion of the side casing 9 and a horizontal shaft 18 is mounted on the lower part of each of these support brackets 20. These horizontal shafts 18 each support a roller 19 in a freely rotatable manner.

The lower surface of the lower casing 8 is supported by these rollers 19 in a freely rotatable manner.

A chain 21 is fixedly secured along the outer periphery of the annular outer wall 8a of the lower casing 8. With the provision of this chain 21, it becomes possible to rotate the lower casing 8 alone, when the die 1 is not to be rotated, by removing the support arms 5 and meshing the chain 21 with a sprocket which is not shown in the drawings.

Figure 2:
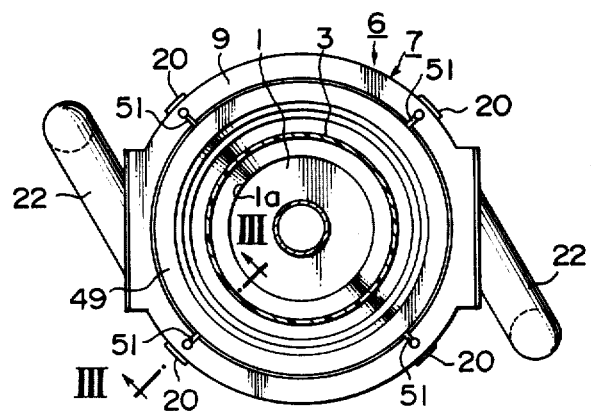
FIG. 2 is a horizontal sectional view taken along line II—II of FIG. 1.

As shown in FIG. 2, a pair of air supply tubes 22 are provided on the outer circumferential surface of the side casing 9 along the tangential directions for introducing cooling air into the air ring main body 7.

This cooling air, after being straightened by the annular air flow straightening vanes unit 15, passes through the opening 14 and is blown out from the vertically spaced two slits for the primary and the secondary cooling actions, respectively, formed by two kinds of slit defining annular bodies which will be described in detail hereinafter, for cooling the bubble 3.

Numerals 23, 24, 25 and 26 in FIG. 3 denote four inverted frusto-conical channel defining bodies which constitute a first slit defining annular body 28 for defining the slit 27 for the primary cooling action by arranging these channel defining bodies just like a set of nested boxes.

Horizontal flanges 23a, 24a, 25a and 26a are provided at the upper opening ends of these channel defining bodies in an outwardly extending manner while horizontal and inwardly extending flanges 23b, 24b and 25b are provided at the lower opening ends of the three lower channel defining bodies 23, 24 and 25.

The inwardly extending flanges 23b, 24b and 25b at the lower ends of the channel defining bodies 23, 24 and 25 are each provided with a substantially coaxial through hole 29 which is slightly greater than the lip 1a of the die 1 in diameter. The bottom end surface 26b of the uppermost channel defining body 26 defines another through hole 30 which is slightly greater than the previously mentioned through hole 29 in diameter.

The channel defining bodies 23, 24, 25 and 26 may be independently moved along the vertical or the axial direction by threading the male thread portions 23c, 24c, 25c and 26c of the external circumferential surfaces of the flanges 23a, 24a, 25a and 26a at the upper portions of the channel defining bodies 23, 24, 25 and 26 with a female thread portion 8d of the internal circumferential surface of the annular inner wall 8b of the lower casing 8, and cooling air channels 31, 32 and 33 are defined between the channel defining bodies 23, 24, 25 and 26, in that order counting from the lowermost one.

The flanges 24a, 25a and 26a of the upper three channel defining bodies 24, 25 and 26 are each provided with a pluraity of through holes 34, 35 and 36, respectively, so as to let the cooling air from the opening 14 flow therethrough into the channels 31, 32, 33 and 34, and the upper surface of the inner end portion of the flanges 24a and 25a are provided with annular projections 24d and 25d for the purpose of adjusting the widths of the channels 32 and 33.

Next is described the three branched slits which constitute the slit 27 for the primary cooling action.

The inner end of the middle channel 32 is formed into a second branched slit 38 having an upwardly inclined annular configuration by an annular projection 24d formed in the bottom end of the slit defining body 24 and a cut-out 25d provided in the bottom end of the channel defining body 25.

The internal end of the upper channel 33 defines an upwardly extending third branched slit 39 by an annular projection 25e formed on the upper part of the bottom end of the channel defining body 25 and the lower end of the channel defining body 26.

The slit 27 for the primary cooling action is formed by these branched slits 37, 38 and 39.

The upper end of the uppermost channel defining body 26 is provided with an annular projection 26e which extends upwardly along an inner bore surrounding wall 26d of the channel defining body 26 and defines a channel 41 of an inverted L-shaped cross-section at its outer periphery, communicating with the opening 14, in cooperation with an annular wall 40a extending from a support ring 40 fit into the internal end surface of the upper casing 10 opposing thereto. Furthermore, the upper end of this channel 41 is provided with a slit 42 with an open top side for the secondary cooling action.

On top of the support ring 40 is mounted a second slit defining body 43 for changing the direction of the cooling air blowing out from the slit 42. This is now described in the following with reference to FIGS. 4 to 6.

The top surface of the upper support ring 40 is provided with grooves 44 of a rectangular configuration as seen from above and extending in the radial direction and each of these grooves 44 slidably receives a substantially L-shaped slide rod 45 with an upwardly extending outer end portion 45a.

The upper surface of the inner end portion of each of the slide rods 45 is securely attached to a horizontal air deflection plate 46a which is made by cutting a sheet material into an arcuate configuration at a certan width and rounding its two end portions, and the inner end portion 45a of the slide rod 45 is provided with a roller 47 which is freely rotatable about a vertical axial line.

Numeral 48 denotes an annular cam plate whose inner periphery is provided with arcuate cam grooves 4 which have a sufficient width for slidably and rotatably receiving the corresponding rollers 47 and intersect with the inner peripheral surface at a predetermined angle, and this cam plate 48 is slidably mounted on the support ring 40.

Figure 5:
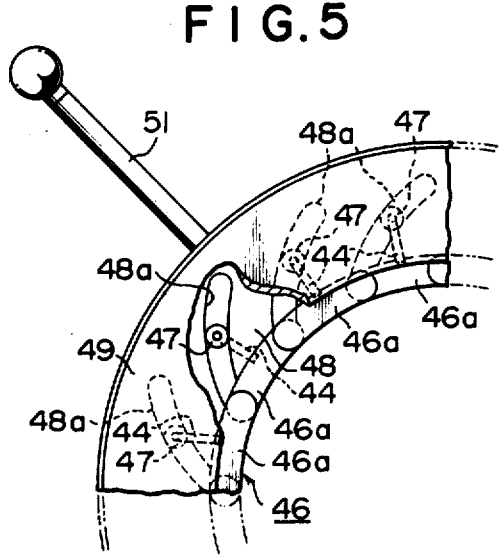
FIG. 5 is a partially broken-away plan view of the annular cover.
Figure 6:
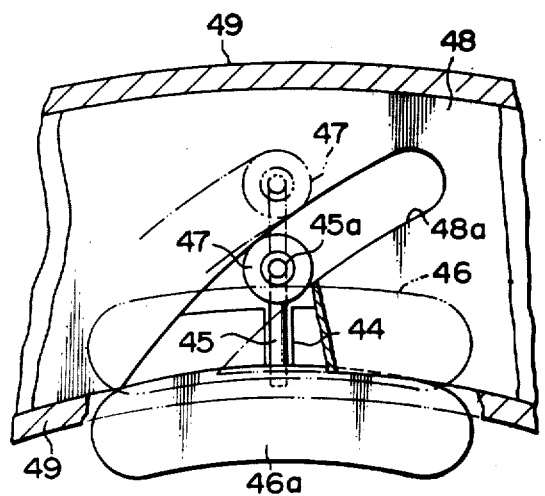
FIG. 6 is a magnified view of a part of FIG. 5.

As shown in FIG. 5, when the slide rods 45 are received in the corresponding grooves 44 and the rollers 47 are loosely received in the corresponding cam grooves 48a, the two ends of each of the air deflection plates 46a are overlapping with those of the adjacent ones 46a to form a ring 46 as a whole.

Numeral 49 denotes an annular cover and its groove portion 49a with an inverted U-shaped cross-section is fit onto the external peripheral surface of the cam plate 48 and an annular gap 50 is defined between the lower surface of the annular cover 49 adjacent to its inner peripheral wall and the upper surface of the support ring 40 adjacent to its inner peripheral wall for pushing out and pulling in the air deflection plates 50 therefrom and thereinto.

The outer peripheral surface of the annular cover 49 has four outwardly protruding handle bars 51 therearound so that the cam plate 48 may be rotatable about a vertical axial line with these handle bars 51.

Now the handling and the action of the air ring for inflation film molding of the above-described structure according to this invention is described in the following.

To the end of removing the unevenness in the thickness of the film, the lower casing 8 of the air ring main body 7 is rotated by the rotor 4 by way of the die 1 and the arms 5.

Next, molten thermo-plastic resin of high temperature is extruded from the lip 1a of the die 1 and is molded into a tubular thin film or a bubble 3, and the bubble 3 is expanded in diameter and extended by the cooling air blown inwardly of the die 1 as the bubble 3 goes up.

Meanwhile, in regards to the outer surface of the bubble 3, the cooling air introduced into the air ring main body 7 from the air supply tubes 22 is straightened by an annular air flow straightening vanes unit 15 and, after passing through the opening 14, is partially blown toward the bubble 3 from the slit 42 for the secondary cooling action by way of the upper passage 41 while the remaining cooling air enters the channels 31, 32 and 33 by way of the through holes 34, 35 and 36 and is blown out from the slit 27 or the branched slits 37, 38 and 39 to cool the part of the bubble 3 adjacent to the die 1.

In this cooling action for the bubble 3, the direction of the cooling air blowing out from the portions of the branched slits 37, 38 and 39 adjacent to the die 1 vary as indicated by arrows (a), (b) and (c).

Fhrthermore, the mutual distances between the channel defining bodies 23, 24, 25 and 26 are adjustable by turning the threaded portions 23c, 24c and 25c clockwise or counter-clockwise.

When it is desired to increase the cooling effect for the lower portion of the bubble 3, the wind pressure of the branched slit 37 is increased while, when it is desired to increase the cooling effect for the upper part of the bubble 3, the wind pressure of the branched slit 38 is increased by adjusting the axial positions of the channel defining bodies 23, 24, 25 and 26.

When a die of a smaller diameter is used, the distance between the slit 27 and the die 1 increases but it is possible to get the cooling air to effectively reach the bubble 3 by increasing the wind pressure of the lower branched slit 37.

Coversely, when a die 1 of a greater diameter is used, the distance between the slit 27 and the bubble 3 becomes so small that directly blowing high speed air onto the bubble 3 causes a depression in the bubble 3 which is undesirable in the molding process. Under such a circumstance, it is possible to reduce the wind pressure at the lower branched slit 37 and to increase the wind pressure of the upper branched slit 38. Since the upper branched slit 38 has an upwardly directed air outlet, the high speed cooling air strikes the bubble 3 at an oblique angle and does not deform the bubble 3.

Thus, the cooling zone of the bubble 3 may be freely determined by appropritately combining or selecting the wind velocities of the slit 27 including a plurality of slits with different outlet angles.

Conventionally, even though the cooling zone varies considerably depending on the size of the die 1, the kind of the resin, the wall thickness of the bubble and so on, the cooling zone has been restricted because only one slit is used and the slit has to be replaced to another with different diameter for different molding conditions. However, according to this invention, the slit may be adapted to different molding conditions in a very simple manner.

Also, the channel defining body 23, 24, 25 and 26 are given with an inverted frusto-conical configuration for adapting themselves to the configuration of the bubble 3.

Hence, as the air blown out from the branched slits 37, 38 and 39 passes, at high speed, through the air channels defined between the bubble 3 and the channel defining bodies 26 at a predetermined interval, a venturi effect is produced and the otherwise unstable bubble 3 is thereby sucked radially outwardly with the result that the bubble 3 is effectively molded keeping a fixed configuration without any wobbling.

In other words, wrinkles, slacks, uneven wall thickness and other problems due to the wobbling of the bubble is much reduced and a good quality product may be produced. Particularly for mass production where a fairly large volume of cooling air is required, increasing the wind pressure often causes deformation and wobbling of the bubble 3 to such an extent that the molding process becomes impossible.

However, according to this invention, the greater the volume of the cooling air, the more the venturi effect is enhanced, and the stability of the bubble 3 becomes improved. The reason for directing the outlet of the upper branched slit 39 upwardly is to enhance this venturi effect.

Figure 4:
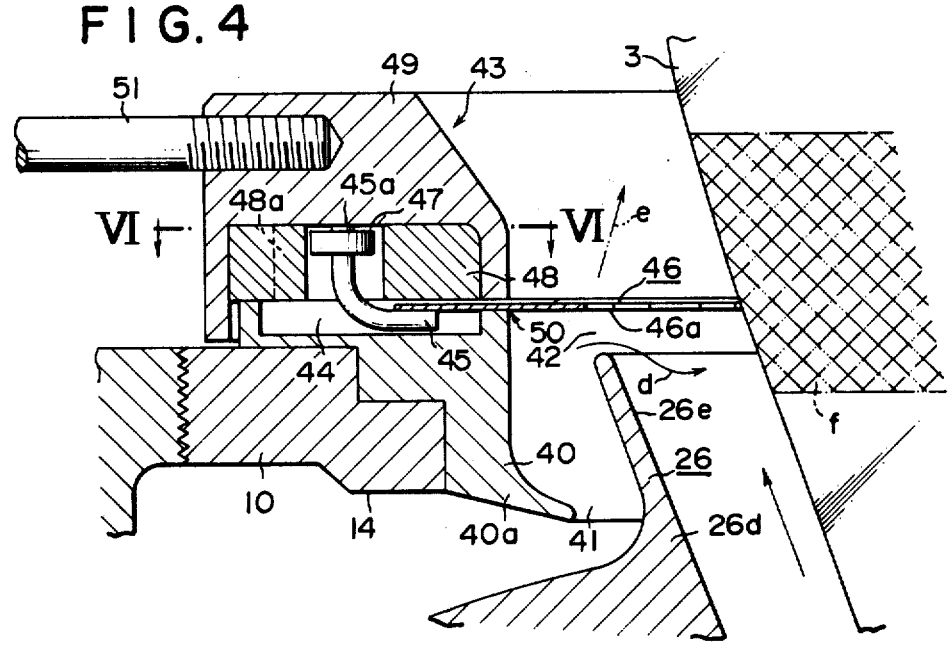
FIG. 4 is a magnified view of a part of FIG. 3.

As shown in FIG. 4, in the second slit defining annular body 43, the inner diameter of the ring 46 is variable by rotating the handle bar 51 by a necessary angle.

In other words, when the ring 46 is at its most inwardly protruding state toward the center, the cooling air from the slit 42 strikes the lower surface of the ring 46 and, as indicated by an arrow (d), cools the lower part of the frost line (f) of the bubble 3.

When the ring 46 has been retracted into the annular cover 49, the cooling air from the slit 42 blows out upwardly as indicated by an arrow (e) and can cool the upper part of the frost line (f) of the bubble 3. In other words, by moving the slit defining body 43, the cooling zone of the bubble 3 may be moved.

The air flow straightening vanes unit 15 in the channel 7a of the air ring main body 7 in the above-described embodiment was comprised of an annular main body through which a multiplicity of axially extending circular holes 15a were provided, but the annular main body may be provided with honeycomb holes or grooves instead of the circular holes. Also, it is possible to arrange a plurality of thin plates in a radially extending manner at a circumferentially equal interval or to place a porous annular body in the passage.

Furthermore, instead of the slit defining bodies 28 and 43, a multiplicity of plate strips 55 of an arcuate configuration may be provided so as to be pivoted to the inner periphery of a ring 52 by way of a pin 53 at one end of each of the plate strips 55 and to be moveable along a circular path by way of a link 54 at its other end to constitute an iris diaphragm 56 which can close the opening of the slit with an inscribed circle of each of the plate strips 55.

FIG. 9 shows a different embodiment of this invention. According to this embodiment, a desired number of annular rings 58a, 58b and 58c are attached to the uppermost channel defining body 26 so as to reduce the opening area of the central through hole 42. These annular rings 58a, 58b and 58c are provided with different diameters and complementary internal and external shouldered surfaces 57 and 57a in such a manner that an adjustable means for reducing the opening area of the central through hole 42 may be obtained by mounting a desired number of these annular rings with appropriate inner and outer configurations and diameters.

This feature is useful for the purpose of adapting the air ring of this invention to extrusion molding dies of different diameters. Particularly, when the die diameter is small, it is necessary that the air velocity must be sufficiently great for the cooling air to reach the bubble since the distance the air must travel before it reaches the bubble increases. And the increase in the air velocity tends to produce turbulence particularly in the region which is immediately downstream of the uppermost end 26e of the uppermost channel defining annular body 26 and this turbulence in the cooling air is highly undesirable since it causes the bubble to wobble and the cooling action to become uneven. Thus, the adjustable central through hole area restricting means 58 is highly effective in both restricting the opening area of the central through hole and reducing the occurence of turbulence in the cooling air.

As described in detail hereto, the present invention can offer free selection of the optimum cooling zone in association with the change in the bubble diameter (blow-up ratio) and can increase the molding speed through provision of a slit defining body with an adjustable opening gap at the opening of the slit from which the cooling flows out so as to allow the cooling zone of the bubble to be moveable.

Also, the cooling position adjacent to the frost line has to be extremely finely adjusted for increasing the transparency of the tubular thin film in the inflation molding process for low-density polyethylene (L-LDPE) and the air ring according to this invention can exactly satisfy this requirement.

Furthermore, through provision of vertically spaced slits in the air ring and allowing the directions of the cooling air flow to be variable, the air guide effect for reducing the wobbling of the bubble is improved and the cooling effect at the time of winding up the bubble is enhanced with the result that the adhesion between the thin film (blocking) is prevented and the production rate may be increased.

Although the present invention has been described in terms of specific embodiments, it is obvious to a person skilled in the art that various modifications and replacements may be made in the actual implementation of this invention without departing from the spirit of this invention which is set forth in the appended claims.

What is claimed is:

1. An air ring for inflation film molding in which cooling action is obtained by blowing cooling air out from a horizontal annular slit after the film is extrusion molded by a die, comprising:
   an air ring main body consisting of a hollow annular body and communicating with an air supply tube;
   a slit defining annular body which is disposed substantially coaxially with and within the air ring main body for defining a primary air outlet having the horizontal annular slit for cooling the molded film by blowing cooling air thereto; and
   a channel communicating the air ring main body with the primary air outlet and with another air slit defining body,
   the channel being branched out in the latter slit defining body into a plurality of slits for blowing the cooling air onto the extrusion molded film from more than one direction, said slit defining annular body being comprised of at lease two substantially concentric frusto-conical hollow bodies which are adjustably threaded into a sleeve member at their upper broader ends so that an opening gap defined by the lower free ends of the frusto-conical hollow bodies can be adjusted by changing the relative axial positions of the hollow bodies.

2. An air ring for inflation film molding as defined in claim 1, wherein the slit defining annular body is comprised of four frusto-conical annular bodies which are adjustably threaded at their upper broader ends so that three opening gaps defined at their lower free ends can be independently adjusted.

3. An air ring for inflation film molding as defined in claim 2, wherein the free ends of at least three lower frusto-conical annular bodies are provided with horizontal extensions extending inwardly toward a center.

4. An air ring for inflation film molding as defined in claim 1, the channel defined by the slit defining annular body is variable in cross-section by axially adjusting the uppermost frusto-conical annular body relative to the air ring main body.

5. An air ring for inflation film molding as defined in claim 4, wherein the opening gaps of the free ends of the frusto-conical annular bodies are so disposed as to define opening gaps which have substantially different exit angles.

6. An air ring for inflation film molding as defined in claim 5, wherein the extreme free ends of the frusto-conical hollow bodies are provided with axially protruding annular projections for controlling the exit angle of the air flow coming out from the opening gaps at the free ends of the frusto-conical annular bodies.

7. An air ring for inflation film molding as defined in claim 6, wherein the slit defining annular body is securely attached to an extrusion die so that the die and said body can be integrally rotated.

8. An air ring for inflation film molding as defined in claim 7, wherein an annular cover is provided at an upper end of the air ring main body and is provided with a plurality of horizontal arcuate plates extending toward the molded film and coming out from the air ring main body in such a manner as to be moveable and to form and annular configuration as a whole.

9. An air ring for inflation film molding as defined in claim 8, wherein the air ring main body is comprised of an upper casing, a lower casing and a side casing, the side casing being connected to the air supply tube while the lower and the upper casings are attached to the slit defining annular body, an air seal being provided between the side casing and a unit consisting of the upper and the lower casings so that the upper and the lower casings may be rotated relative to the side casing without losing the air tight state of the air ring main body.

10. An air ring for inflation film molding as defined in claim 9, wherein the channel separating the air ring main body from the slit defining annular body is provided with an air flow straightening annular body which is provided with a plurality of axially extending through holes.

* * * * *